United States Patent Office 3,701,604
Patented Oct. 31, 1972

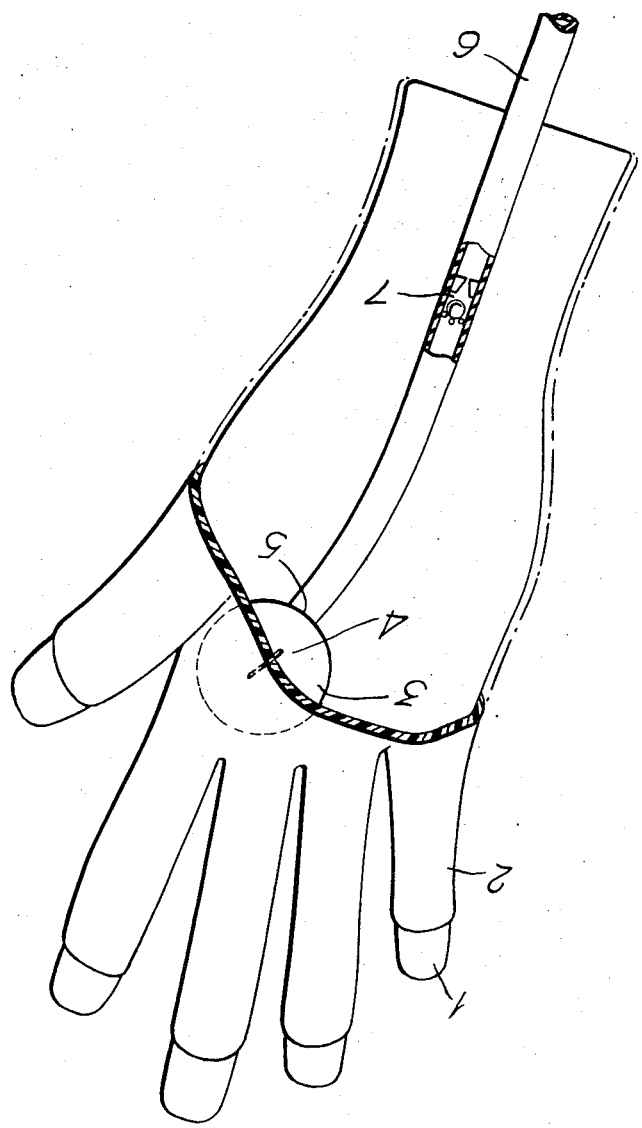

3,701,604
APPLICATOR FOR LIQUIDS
John Holroyd, Oxford, England, assignor to National Research Development Corporation, London, England
Filed May 26, 1970, Ser. No. 40,554
Int. Cl. A46b 5/04
U.S. Cl. 401—7    12 Claims

ABSTRACT OF THE DISCLOSURE

A device for the manual application of a liquid over a surface comprising a glove having absorbent material on the outside and front thereof and adapted for connection to passage means for supplying a controlled flow of liquid from a reservoir to the absorbent material beneath the outer surface thereof, the absorbent material being such that the liquid is expressible through the material on to its outer surface by manual pressure.

---

This invention relates to the application of liquids and, more particularly, to the manual application to surfaces of liquids for which contamination of the surrounding area is undesirable, for example, as in the localised application of herbicides.

The application of a liquid over a surface with the avoidance of any substantial contamination of the surrounding area by the liquid is a technique applicable in a variety of circumstances. It is, for example, of value in several agricultural and horticultural contexts, a particular instance being in the removal of weeds interspersed among an agricultural crop or among plants in a garden. Although the weeds can be removed by uprooting or by the application of a selective herbicide over the whole area, the former method is time-consuming and difficult since the whole of the weeds should be removed, and the latter is apt to prove expensive both as a result of the equipment required and frequently also because of the cost of a suitable selective herbicide. The localised application of a herbicide to the weeds, however, has the advantage that less herbicide is required since it is applied only where required and that a non-selective herbicide may be used if the application is effectively localised.

Despite the advantages conferred by the localised application of herbicide, the methods so far developed for this purpose are far from satisfactory and the method has, therefore, never been widely employed on an agricultural scale. Thus, it has been proposed to apply herbicide to garden weeds by means of a glove having absorbent gripping surfaces which are dipped into and thus charged with a liquid preparation of the herbicide, but this device is inconvenient for use over extensive areas and is also difficult to use without spillage of the herbicide.

According to the present invention a device for the manual application of a liquid over a surface comprises a glove having absorbent material on the outside and front thereof and adapted for connection to passage means for supplying a controlled flow of liquid from a reservoir to the absorbent material beneath the outer surface thereof, the absorbent material being such that the liquid is expressible through the material on to its outer surface by manual pressure.

The use of a device of this type for the application of a herbicide over extensive areas provides a considerable saving in time as compared with previous methods, as well as minimising spillage of the herbicide.

The glove may take various forms, preferably being either a mitt or accommodating one or more of the fingers separately. It is preferred that the absorbent material covers at least the palm, the front of the fingers and the thumb, and the adjacent sides of the thumb and forefinger together with the area between these sides. The absorbent material may be of various types, including a cellular material such as a foam, for example expanded polyurethane, a felt or a woven or non-woven material made from synthetic or non-synthetic material. It is preferred, however, that the material is of a cellular nature so that the liquid is expressed on to the outer frontal surface of the material in the form of a foam. (If desired, the production of a foam can be encouraged by the inclusion of a foam-inducing agent in the liquid.)

Frequently the liquid being applied by the glove is toxic by skin absorption, this being the case with some herbicides. The absorbent material of the glove is thus preferably separated from contact with the hand by a material substantially impermeable to the liquid which is to be applied by the glove. One convenient method of achieving this separation is to construct the glove in two major parts, an under-glove of material substantially impermeable to the liquid, for example, of rubber or plastics material, the interior of which will be in contact with the skin, and an over-glove of absorbent material covering at least part of the front of the under-glove. Conveniently the over-glove may be fixedly attached to the under-glove.

In order to reduce wear on the absorbent surface, the glove may be provided with a covering having a resistance to frictional wear. Passage of the liquid from the absorbent material through the covering must of course be possible, and this may be achieved by the use of a porous material or of a non-continuous material for the covering. Thus a further glove, for example of cotton, or a piece of netting, for example of a plastics material such as nylon, may be used for this purpose. Conveniently this covering, designed to take much of the wear on the glove, may be detachable from the rest of the glove so that it may be replaced as necessary.

Although the passage means may, if desired, terminate within the interior of the absorbent material of the glove, the glove is preferably adapted for connection with passage means for supplying the liquid to the innermost surface of the absorbent material on the front of the glove. It will be appreciated that since the passage means and glove are used in combination, the present invention includes a device for the manual application of a liquid over a surface comprising a glove having absorbent material on the outside and front thereof and passage means for supplying a controlled flow of liquid from a reservoir to the absorbent material beneath the outer surface thereof, the absorbent material being such that the liquid is expressible through the material on to its outer surface by manual pressure. Although various forms of passage means may be used, a convenient simple form is provided by a piece of tubing, for example of rubber or plastics material.

In order to avoid the build up of an excessive quantity of liquid in the absorbent material of the glove, which can lead to dripping of liquid from the glove, the liquid is fed to the glove in a controlled manner, and this control is preferably achieved by the action of appropriate control means incorporated in the glove, or in the passage means, or in both the glove and the passage means. It is particularly convenient if the control means is operated by manual pressure.

One convenient form of control means is provided by a chamber located at the front of the glove beneath the absorbent material, liquid being supplied to the chamber from the passage means, and being discharged from the chamber into the absorbent material in control quantities by a positive operation, for example by manual pressure. The chamber may be constructed individually or may, if desired, be formed integrally with an under-glove. The chamber may be resiliently compressible, the resilience being achieved either by the use of a piece of resilient absorbent material inside the chamber or, more conveniently, by construction of the chamber itself of a resilent material, and it is particularly convenient for the chamber to be charged and discharged respectievly by the action of opening and closing the hand. Thus, the resiliently compressible chamber may conveniently be provided with a slit or slits in its wall adjacent to the absorbent material, which are of a size such that they remain closed when the chamber retains its normal shape but open on compression of the chamber. If means are provided for preventing the flow of liquid back from the chamber into the passage means on compression of the chamber, then the compression will result in the flow of liquid in the chamber, through the opened slit or slits into the absorbent material of the glove. Although the operator can control the amount of liquid discharged from the chamber, it is possible by constructing the chamber with a capacity not greater than that of the adsorbent material to automatically avoid the build up of an excess of liquid in the material. Conveniently, the flow of liquid between the passage means and the chamber may be controlled by a pressure operated non-return valve which closes when back pressure is exerted on it due to compression of the chamber and opens when this pressure is released. This valve may be incorporated either in the glove itself, for example at the entrance to the chamber, or in the passage means adjacent to its connection with the glove. Whilst the chamber may conveniently be located either in the finger portion or the palm of the glove it is most conveniently located in the palm, for example in that area between the thumb and forefinger. It is of course possible, if desired, to use more than one chamber.

A glove according to the present invention may be supplied together with passage means and reservoir as a unit, and the present invention therefore further includes a device for the manual application of a liquid over a surface comprising a glove having absorbent material on the outside and front thereof, a reservoir for containing the liquid, and passage means for supplying a controlled flow of the liquid from the reservoir to the absorbent material, beneath the outer surface thereof, the absorbent material being such that the liquid is expressible through the material on to its outersurface by manual pressure. In order to increase the speed of application of the liquid, a reservoir may be connected with a right and a left hand glove thus allowing both hands to be used. Most conveniently the reservoir may be mounted on the operator, preferably on his back, being held for example by straps over the shoulders. Besides providing a convenient method of transport, mounting the reservoir on the operator's back has the added advantage that it provides a gravity feed to the gloove, aided when a compressible chamber is used by slight suction from the chamber. If desired, however, the feed may be achieved or aided by some other form of forced feed. The passage means may conveniently connect with the base of the reservoir, for example, via a tap. It is preferred that the reservoir is otherwise closed apart from a valve allowing equalisation of the internal and external pressures.

An effective degree of localisation can be achieved in the application of herbicides according to the present invention, thus permitting a wide choice among available herbicides, which may be used in any of their conventional formulations. Thus solutions or emulsions in water and/or organic solvents may be employed, either with or without additives such as wetting agents, surface activants, foam-inducing agents, and other materials including, for example, dyes so that those weeds which have been treated are easily recognised.

The glove may be used for the localised treatment of a variety of weeds, including lalang grass among rubber and oil palms, poisonous weeds, for example ragwort, thistles and nettles, amongst grassland, perennial weeds in perennial cross, for example bindweed among vines, and shrubs and saplings. It may be used with particular advantage in the case of any crops from which weeds are at present removed by hand, for example for the treatment of wild and red rice among cultivated rice, especially where the weeds project above the main crop and are thus readily visible.

The use of the glove of this invention has met with considerable success in the treatment of wild oats (*Avena fatua* and *Avena ludoviciana*) particularly among temperate cereal crops such as wheat and barley but also among other crops such as sugar beet and potatoes (the present methods for the removal of the wild oats, which is of some importance, not being totally satisfactory). With a glove employing a resiliently compressible chamber in conjunction with a pressure operated non-return valve, the successive opening and closing of the hand as it is placed around each wild oat plant will automatically charge and discharge the chamber, and it is thus possible to achieve a rapid rate of operation even when the whole plant is treated including the tillers. Although the speed of operation is affected by the density of the wild oats, an average rate of treatment is 1000 panicles per hour as compared with 500 panicles per hour for hand pulling, and some operators are able to achieve rates of 2000–3000 panicles per hour, sufficient herbicide being contained in a reservoir of convenient size to treat this number of plants without recharging.

A variety of herbicides may be used for the treatment of the wild oats and there is no need to use only selective herbicides.

Although the invention has been particularly described in relation to the localised application of non-selective herbicides to weeds, interspersed among agricultural crops, it will be appreciated that it is equally applicable to the treatment of weeds in gardens. Furthermore, it has a wide agricultural use both with herbicides, for example for the treatment of parasitic weeds on the roots of crops such as striga on maize and for the treatment of weeds such as mistletoe on trees, and also with other liquids, for example for the application of insecticides to crops and of compositions to the stumps of branches and trees. Additionally, the invention has uses outside the agricultural field, for example veterinary applications, and may, in fact, be used with advantage in many situations where the localised application of a liquid over a surface is required.

The invention is illustrated by the accompanying drawing and example.

In the figure, which is diagrammatic in nature and not to scale, the glove comprises a rubber under-glove 1 to which is attached an over-glove 2 of ⅛" thick expanded polyurethane which covers the surface of the under-glove 1 with the exception of the tips of the fingers and the thumb and the wrist portion thereof. Between the over-glove 2 and the under-glove 1, located on the palm of the under-glove 1 between the thumb and forefinger thereof, is a rubber bulb 3 with a capacity no greater than that of the over-glove 2. The bulb 3 is provided with a slit 4 and is detachably connected through an opening 5 with a tube 6 of plastics material which incorporates a non-return valve 7. (The connection of the glove with the tube 6 may in an alternative embodiment be of a permanent nature.)

In operation, the tube 6 is connected to a reservoir (not shown) containing the liquid which is to be applied by the glove. When the hand is open, as shown in the figure, liquid flows from the reservoir through the tube 6, past the open valve 7, and into the bulb 3. Since the slit 4 is closed, however, the liquid does not pass out of the bulb 3. On compressing the bulb 3 with the forefinger or thumb the slit 4 is opened and the valve 7 is closed. Liquid then passes from the bulb 3 through the slit 4 into the over-glove 2 appearing eventually as a foam on the surface of the front of the over-glove 2. The hand is then opened, the opening of the hand closing the slit 4, opening the valve 7 and thus recharging the bulb 3. The liquid may be applied from the surface of the over-glove 2 with the hand either clinched or open depending on the type of surface to be treated.

I claim:

1. A device for the manual application of a liquid over a surface substantially without spillage thereof comprising a glove having a frontal outer surface and a hand receiving portion, absorbent material covering at least a portion of said outer surface, said absorbent material having an inner surface and an outer surface, passage means for connecting said glove with a reservoir for the liquid to supply the liquid from the reservoir to said inner surface of said absorbent material, and said passage means including a pressure operated non-return valve for controlling the supply of liquid to said absorbent material, said absorbent material being such that the liquid is expressible therethrough onto said outer surface thereof in response to pressure exerted by a hand within the glove.

2. A device according to claim 1, wherein the glove is provided with liquid impervious material, said material separating said absorbent material from said hand receiving portion.

3. A device according to claim 1, comprising means for actuating said pressure operated non-return valve, said means being operable by pressure exerted by a hand within the glove.

4. A device according to claim 3, wherein said actuating means comprises a chamber which is charged with liquid from said passage means and from which liquid is discharged into said absorbent material, said chamber being constructed from a resiliently compressible material so that charging and discharging of liquid therefrom, respectively, is effected on expansion and compression of said chamber.

5. A device according to claim 4, wherein said chamber has a liquid capacity no greater than the absorbing capacity of said absorbent material.

6. A device according to claim 5, wherein the flow of liquid to said chamber from said passage means is controlled by said pressure operated non-return valve and the flow of liquid from said chamber to said absorbent material is controlled by a pressure responsive means.

7. A device according to claim 6, wherein said chamber has at least one slit formed therein which provides said pressure responsive means, said slit opening on compression of said chamber and closing on expansion of said chamber.

8. A device according to claim 1, wherein said glove is formed with a thumb and comprises liquid impervious material fully covering the hand, said absorbent material convering at least the palm of said glove.

9. A device as claimed in claim 1 wherein said absorbent material is of a cellular nature so that the liquid is expressible onto said outer surface of said absorbent material as a foam.

10. The device as claimed in claim 1 wherein said passage means comprises a length of hollow tubing.

11. A device for the manual application of a liquid over a surface substantially without spillage thereof comprising a glove having a frontal outer surface, absorbent material covering at least a portion of said surface, said absorbent material having an inner surface and an outer surface, a portable reservoir for the liquid located externally of said glove, means for connecting said glove with said reservoir to supply the liquid from the reservoir to beneath said outer surface of said absorbent material, and a pressure operated non-return valve for controlling the supply of liquid to said absorbent material, said absorbent material being such that the liquid is expressible therethrough onto said outer surface thereof in response to pressure exerted by a hand within the glove.

12. A device for the manual application of a liquid over a surface substantially without spillage thereof comprising a glove constructed from a material that is impervious to the liquid, absorbent material covering at least a portion of said impervious material, said absorbent material having an inner surface adjacent said impervious material and an outer surface, a chamber for containing the liquid to be applied, said chamber being disposed between said inner surface of said absorbent material and said impervious material, said chamber having pressure responsive means for controlling the supply of liquid contained therein to said inner surface of said absorbent material and said absorbent material being such that the liquid is expressible therethrough onto said outer surface in response to pressure exerted by a hand within said glove, passage means for connecting said chamber in said glove with a reservoir located externally of said glove for supplying liquid from said external reservoir to said chamber, said passage means having a pressure operated non-return valve for controlling the supply of liquid from the external reservoir to said chamber.

References Cited

UNITED STATES PATENTS

| | | | |
|---|---|---|---|
| 2,061,219 | 11/1936 | Wright | 401—7 |
| 2,075,850 | 4/1937 | Johnson | 401—7 |
| 1,359,985 | 11/1920 | Gromer | 401—7 X |
| 2,946,154 | 7/1960 | Bornemann | 47—1 |

WILLIAM H. GRIEB, Primary Examiner

U.S. Cl. X.R.

47—1.5; 401—204